Feb. 17, 1925.
J. O. WILSON
TANK VALVE
Filed Oct. 26, 1920
1,526,890
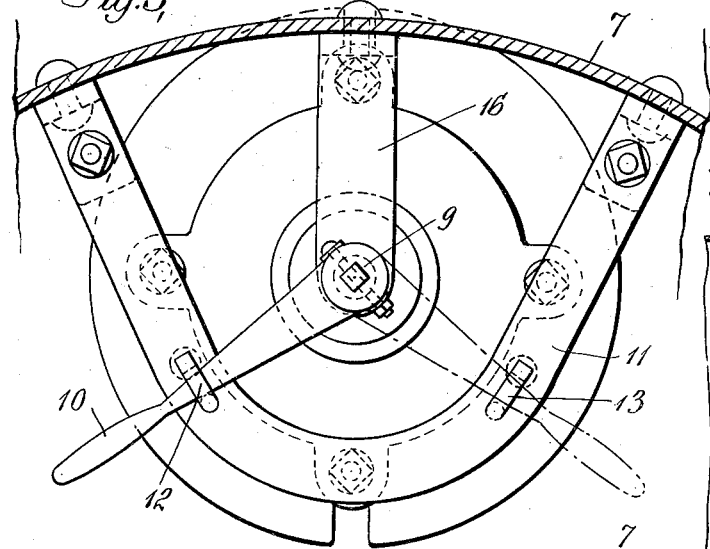
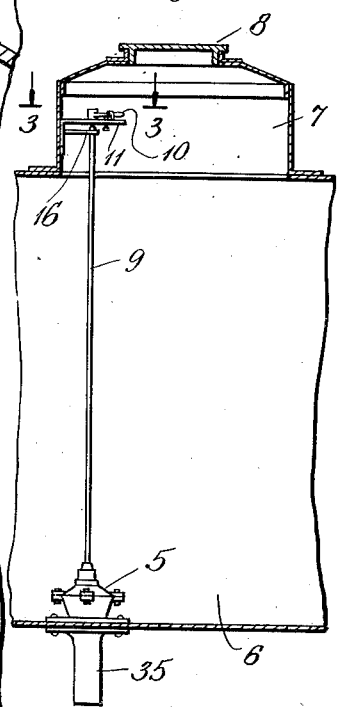
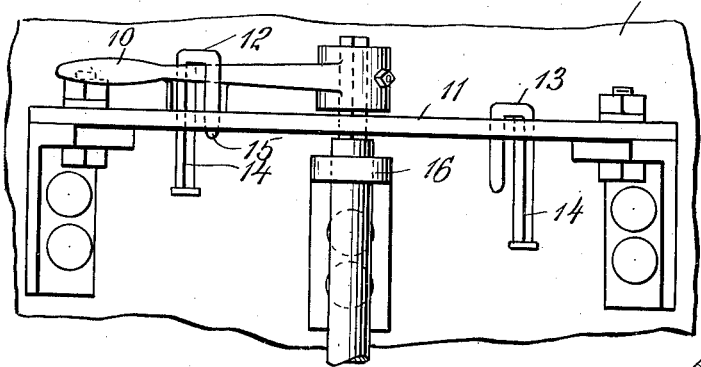
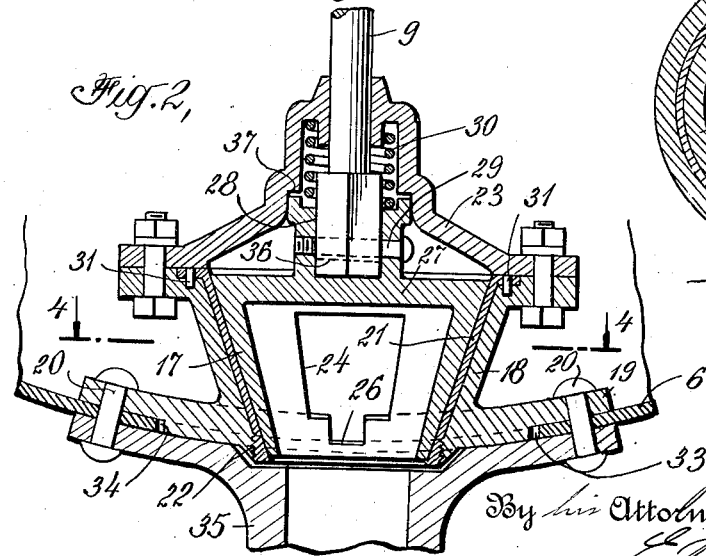
Inventor
James O. Wilson
By his Attorney
E. W. Marshall Patented Feb. 17, 1925.

1,526,890

UNITED STATES PATENT OFFICE.

JAMES O. WILSON, OF JERSEY CITY, NEW JERSEY, ASSIGNOR TO THE TEXAS COMPANY, OF NEW YORK, N. Y., A CORPORATION OF TEXAS.

TANK VALVE.

Application filed October 26, 1920. Serial No. 419,618.

*To all whom it may concern:*

Be it known that I, JAMES O. WILSON, a citizen of the United States, and a resident of Jersey City, county of Hudson, and State of New Jersey, have invented certain new and useful Improvements in Tank Valves, of which the following is a specification.

The present invention relates to tank cars, and the objects of the invention are to provide a simple and effective form of discharge valve for such cars which will be located and therefore protected by the tank and which will furthermore enable complete discharge and drainage of the tank.

In the drawing accompanying and forming a part of this specification, I have disclosed the invention embodied in a practical and commercial form, but wish it understood that the same may be modified in various respects without departure from the true spirit and scope of the invention as hereinafter defined and claimed.

Figure 1 is a fragmentary sectional portion of the tank of a tank car equipped with my invention.

Figure 2 is a broken sectional view of the valve mechanism on an enlarged scale and taken on a plane transversely of the tank.

Figure 3 is a fragmentary or part sectional plan view of the valve and its operating mechanism.

Figure 4 is a cross sectional view of the valve on substantially the plane of the line 4—4 of Figure 2.

In Figure 1 I have shown how the valve which is designated generally by the reference character 5, is located wholly within and therefore mounted and protected by the tank 6. This tank I have shown as having the usual dome 7 closed by a manhole cover 8, and I have shown the valve as operated by the rod or stem 9 extended upwardly into the dome and there provided with a handle 10 by which the valve is operated.
This handle traverses an arc or segment 11 and is secured in the valve open compound or valve closed compound positions by hooks 12, 13, having square shanks 14 slidingly guided in correspondingly shaped openings in the segment 11 and having round or pointed ends 15 designed to enter correspondingly shaped openings in the segment. When one of these inverted U-shaped clips is hooked over the handle as in Figure 2, it will be seen that the valve will be retained in the desired relation, and this form of fastening allows for the necessary expansion and contraction. When it is desired to shift the valve, it is simply necessary to lift the retaining hook clear of the handle and swing the handle through the necessary arc and catch the same beneath the other hook. Near its upper end the valve rod 9 is usually guided by being pivotally engaged in the arm of a bracket 16 extending inwardly from the wall of the tank of the dome.

The valve proper is in the form of an inverted frusto-conical hollow body 17 rotatably seated in a correspondingly shaped casing 18 having a base flange 19 shaped to fit the concavity of the tank and suitably secured thereto as by means of rivets 20.

The valve casing is usually fitted with a liner 21 of brass or other non-corrosive material which may be secured in place as by means of the threaded connection at 22 and by means of the cap 23 which closes the top of the valve casing. The valve is formed with an outlet opening or openings 24 in one or opposite sides of the same, and the valve casing is constructed with a similar opening or openings 25.

The valve openings 24, the valve casing openings 25 and the base flange 19 are all cut down to a level below the lowest point in the tank bottom, as I have indicated particularly at 26 in Figures 2 and 4. These cut down portions form in effect drainage channels extending inwardly through the base flange into the interior of the valve (Figure 4) to insure complete drainage of the tank contents when the valve is open.

The head of the valve is closed as I have indicated at 27 in Figure 2, and in this same view I have shown that this closed top of the valve carries an angular socket 28 for the correspondingly shaped lower end of the valve actuating rod. This lower end of the valve rod may be secured in the socket as by means of a pin 29 so that the valve may be slightly lifted off its seat by an upward pull on the handle.

The valve is normally yieldingly held to its seat by a spring 30 seated in the cap of the valve casing and bearing against the upper end of the socket extension of the valve.

To prevent the lining from working loose in the valve casing, the same may be pinned or otherwise secured against rotation as I have indicated at 31.

It will be seen that the valve of my invention enables the complete discharge of the tank contents and that said valve is mounted within and entirely protected by the tank. This prevents unauthorized meddling with the valve and overcomes the danger of the valve being broken off or injured by rough handling in transit. The valve furthermore is of strong sturdy construction and with all its other advantages can be produced and installed relatively inexpensively. In order that the valve may be seated as low as possible in the bottom of the tank, I have shown the base flange of the valve casing as shouldered at 33 to permit the same to fit down into the opening 34 provided therefor in the bottom of the tank.

It will be noted that in my invention the valve mechanism is independent of the outlet chamber 35 which may be of any ordinary or usual construction. This makes it possible to apply the invention to tanks now in use and without requiring any special alterations.

A slight lost motion is usually provided in the connection between the valve rod 9 and the valve. Thus in Figure 2 I have shown the opening 36 in the valve rod as somewhat larger than the pin 29. This connection is not so loose, however, but what the valve rod will lift or "ease" the valve off of its seat. This lifting movement of the valve is limited in the illustration by the engagement of cooperating shoulders between the hub of the valve and the wall of the valve casing as indicated at 37. The motion allowed the valve is enough to free the valve in case it should become stuck, but preferably is not enough to permit any appreciable leakage of oil. The cooperating shoulders at 37 also provide a means to prevent the valve being lifted from its seat by the insertion of a rod or tube out through the outlet chamber 35. The movement as stated is only sufficient to release the valve without permitting any appreciable escape of liquid. The lost motion connection between the valve and valve rod also prevents the transmission of stress, strength or undue vibration to the valve, and also takes care somewhat of the tank expansion.

What I claim is:

1. In a tank valve, a valve casing having an inverted substantially frusto-conical valve seat and provided with an opening or openings in the side thereof, an inverted substantially frusto-conical hollow valve body fitted in said seat, having a closed upper end and discharge opening or openings in the side thereof to register with the discharge opening or openings of the valve seat, said openings having registering drain channels arranged to stand at least as low as the lowest point of the tank, and the valve casing having a base flange seated in the bottom of the tank and provided with a channel forming an extension of the drain channel aforesaid.

2. In a tank valve, a valve casing having an inverted substantially frusto-conical valve seat and provided with an opening or openings in the side thereof, an inverted substantially frusto-conical hollow valve body fitted in said seat, having a closed upper end and discharge opening or openings in the side thereof to register with the discharge opening or openings of the valve seat, said openings having registering drain channels arranged to stand at least as low as the lowest point of the tank, a valve actuating rod engaged with the closed top of the valve and a spring in the valve casing above said closed top for yieldingly forcing the valve to its seat, said rod having a handle at its upper end, a segment and a hook slidingly engaged with said segment and arranged to fit over said handle.

3. In a tank car, a rotatable valve mounted in the bottom of the tank, a valve actuating rod extending from the said valve to the upper portion of the tank, a segment about the upper portion of said rod, an operating handle on said rod above the segment and hooks vertically slidable on the segment and arranged to be engaged over the handle for securing the valve in predetermined relations.

In witness whereof, I hereunto set my hand this 22nd day of October, 1920.

JAMES O. WILSON.